A. SMITH.
GATE OPERATING MEANS.
APPLICATION FILED DEC. 29, 1913.
1,217,353.
Patented Feb. 27, 1917.
2 SHEETS—SHEET 1.
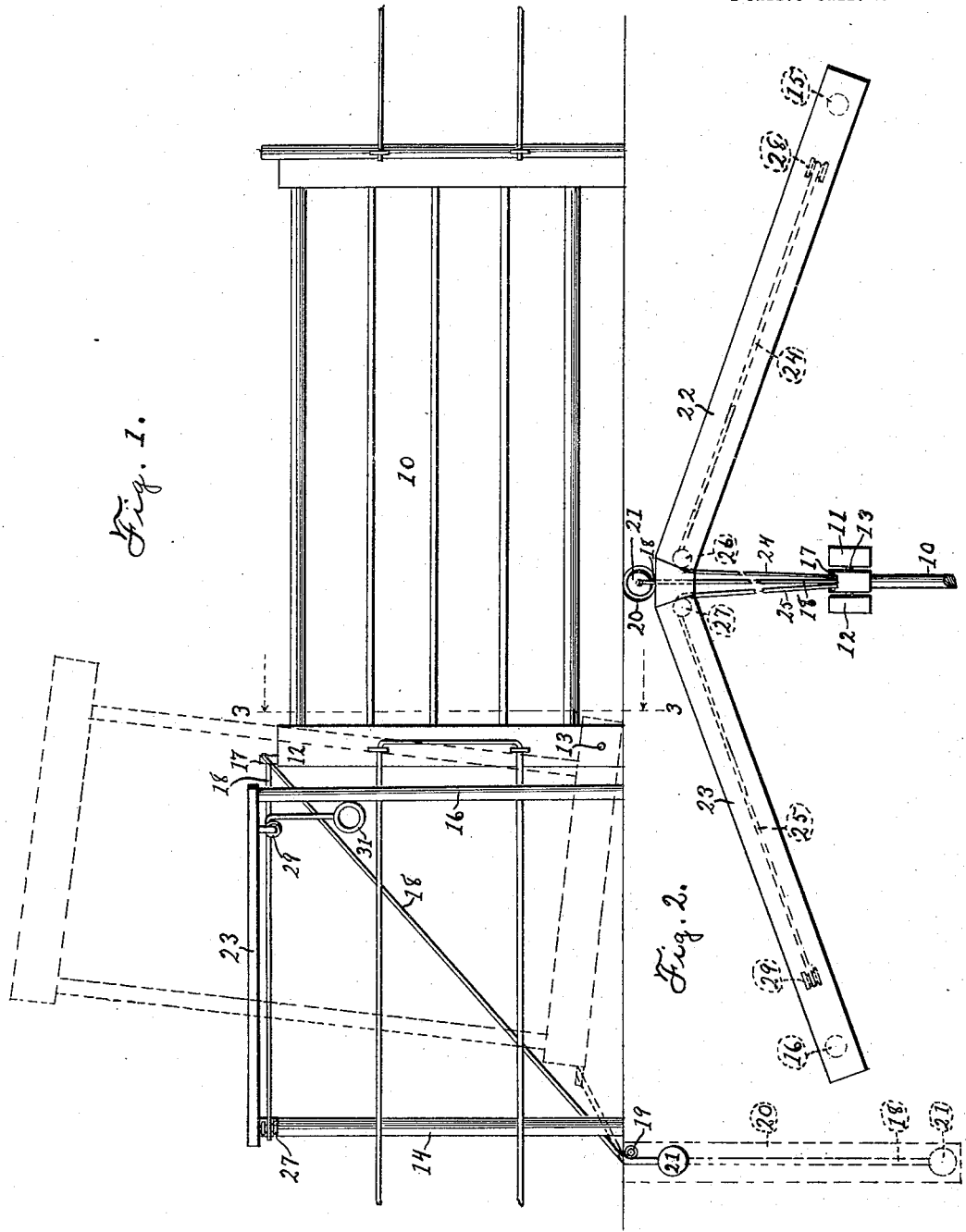
Witnesses.
Robert C. Palmer.
L. C. Kaiser
Inventor:
ALBERT SMITH
by Earl M. Sinclair
Atty.

A. SMITH.
GATE OPERATING MEANS.
APPLICATION FILED DEC. 29, 1913.
1,217,353.
Patented Feb. 27, 1917.
2 SHEETS—SHEET 2.
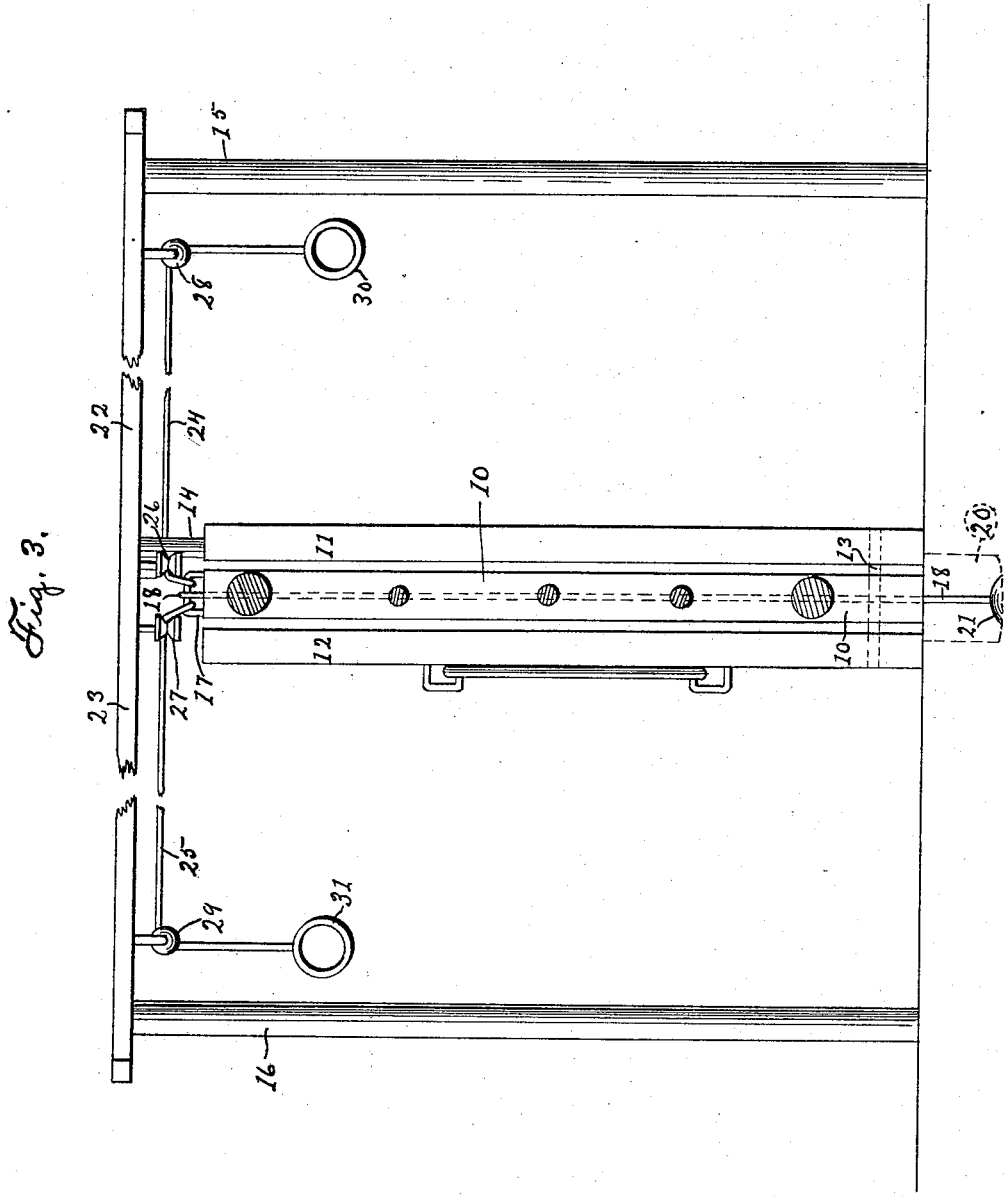
Witnesses
Robert Palmer.
L. C. Kaiser
Inventor.
ALBERT SMITH
by Earl M. Sinclair Atty.

UNITED STATES PATENT OFFICE.

ALBERT SMITH, OF FONDA, IOWA.

GATE-OPERATING MEANS.

1,217,353.  Specification of Letters Patent.  Patented Feb. 27, 1917.

Application filed December 29, 1913. Serial No. 809,420.

*To all whom it may concern:*

Be it known that I, ALBERT SMITH, a citizen of the United States of America, and resident of Fonda, Pocahontas county, Iowa, have invented a new and useful Gate-Operating Means, of which the following is a specification.

The object of this invention is to provide improved means for operating a tilting gate.

My invention consists in the construction, arrangement and combination of elements hereinafter set forth, pointed out in my claim and illustrated by the accompanying drawings, in which—

Figure 1 is an elevation of the complete device, dotted lines indicating the gate in open position. Fig. 2 is a plan of portions of the device. Fig. 3 is a sectional elevation on the line 3—3 of Fig. 1, on an enlarged scale.

In the construction of the device as shown the numeral 10 designates generally a gate, which may be of any desired construction. Hinge posts 11, 12 are placed side by side and the gate 10 is mounted therebetween at its rear end and is hinged thereto by means of a pintle or hinge bolt 13 at the bottom of said rear end. The gate 10 is adapted to be moved upwardly and rearwardly through an arc on the pintle 13 to the position indicated by dotted lines in Fig. 1, with its free end in the air. A post 14 is planted at the rear of the hinge posts 11, 12 a distance approximating to the height of the gate. The post 14 may be one of the regular fence posts but preferably is somewhat higher than the gate 10. Operating posts 15, 16 are placed at either side and preferably in advance of the post 14; that is to say, adjacent the roadway. An eye 17 is fixed in the top of the rear post of the gate 10 and a cable 18 is fixed at one end thereto, extends rearwardly and downwardly to a point adjacent the base of the post 14, preferably passes over a pulley 19, and extends within a hole 20 in the ground, which hole may be incased with tiling (not shown). A weight 21, counterbalancing approximately the gate 10, is fixed to the end of the cable 18 and is adapted for vertical movement within the hole 20. Bars 22, 23 preferably are fixed to the upper ends of and connect the posts 14—15 and 14—16 respectively. Operating ropes 24, 25 are fixed at their ends to the eye 17, on opposite sides of the cable 18, extend rearwardly toward the top of the post 14, and pass around direction pulleys 26, 27 carried by inner end portions of the beams or bars 22, 23 respectively. The ropes 24, 25 extend laterally beneath the beams or bars 22, 23 and pass over and depend from pulleys 28, 29 carried by outer end portions of said bars. Handles 30, 31 are fixed to the depending end portions of the operating ropes 24, 25 and are adapted to be grasped manually to operate the gate in either direction.

In operation, a slight jerk on either operating rope 24, 25, through its handle, causing rearward draft on the eye 17, will be sufficient to overcome the stable equilibrium of the gate 10 and allow the weight 21 to carry said gate to open position, the weight descending in the hole 20. A corresponding jerk on either operating rope will have the opposite effect, through upward draft on the eye 17, and the gate 10 will overcome the stable equilibrium of the weight 21 and the gate will return to closed position. That is to say, the same act is performed to initiate either operation, opening or closing; the actual work being performed through the counterbalancing of weight and gate. The handles 30, 31 are in exactly the same position at all times except during the opening or closing operation, when they descend and immediately rise to former position. This is on account of the spacing of the post 14 from the gate above mentioned.

If desired the beams or bars 22, 23 may be dispensed with and the pulleys 26, 27, 28, 29 be carried directly by the posts 14, 15 and 16.

Any suitable covering may be provided for the hole 20 if deemed necessary.

I claim as my invention—

Gate-operating means, comprising spaced hinge posts, a gate between and hinged at its lower rear corner to said posts, a post at the rear of said hinge posts, operating posts on opposite sides of and spaced from said hinge posts, beams connecting upper end portions of said operating and rearmost post, an eye in the upper rear corner of the gate, a cable fixed to said eye and extending rearwardly and downwardly to the base of the rearmost post, a pulley located at the base of the rearmost post in substantially the same horizontal plane as the pivot of the gate, over which pulley said cable passes, a weight on said cable counterbalancing said gate, pulleys supported by said beams adjacent the operating posts, operating ropes separately fixed to said eye on opposite sides of and adjacent to the cable, said operating ropes passing rearwardly around the first pulleys, and thence laterally in opposite directions over said latter pulleys, and handles on depending end portions of said operating ropes.

Signed by me at Fonda, Iowa, this 26th day of May, 1913.

ALBERT SMITH.

Witnesses:
E. SPENGLER,
C. A. MAINS.